(12) United States Patent
Mackey et al.

(10) Patent No.: US 7,904,711 B2
(45) Date of Patent: Mar. 8, 2011

(54) SCALEABLE ARCHITECTURE TO SUPPORT HIGH ASSURANCE INTERNET PROTOCOL ENCRYPTION (HAIPE)

(75) Inventors: Christopher D. Mackey, Spencerport, NY (US); Brian Boorman, Honeoye, NY (US)

(73) Assignee: Harris Corporation, Melbourne, FL (US)

( * ) Notice: Subject to any disclaimer, the term of this patent is extended or adjusted under 35 U.S.C. 154(b) by 746 days.

(21) Appl. No.: 11/877,720

(22) Filed: Oct. 24, 2007

(65) Prior Publication Data

US 2009/0113201 A1    Apr. 30, 2009

(51) Int. Cl.
*H04L 29/06* (2006.01)
(52) U.S. Cl. ............................................. 713/151
(58) Field of Classification Search ............... 713/151
See application file for complete search history.

(56) References Cited

U.S. PATENT DOCUMENTS

| | | | | |
|---|---|---|---|---|
| 2005/0213762 A1* | 9/2005 | Hyland | ............ | 380/255 |
| 2005/0216726 A1* | 9/2005 | Dellmo et al. | ............ | 713/151 |
| 2005/0216734 A1* | 9/2005 | Yancy et al. | ............ | 713/160 |
| 2005/0216750 A1* | 9/2005 | Bricher et al. | ............ | 713/189 |
| 2005/0216751 A1* | 9/2005 | Dellmo et al. | ............ | 713/189 |
| 2005/0216765 A1* | 9/2005 | Petkus et al. | ............ | 713/201 |
| 2006/0059537 A1* | 3/2006 | Alvermann et al. | ............ | 726/1 |
| 2006/0256817 A1 | 11/2006 | Durst | ............ | 370/466 |
| 2007/0076599 A1* | 4/2007 | Ayyagari et al. | ............ | 370/229 |
| 2008/0181394 A1* | 7/2008 | Keefe et al. | ............ | 380/28 |

OTHER PUBLICATIONS

Brian C. Boorman et al. A Scalable Hardware Architecture to Support Applications of the HAIPE 3.1 Standard. 2007. IEEE. p. 1-8.*

* cited by examiner

*Primary Examiner* — Christian LaForgia
(74) *Attorney, Agent, or Firm* — Allen, Dyer, Doppelt, Milbrath & Gilchrist, P.A.

(57) ABSTRACT

A scalable internet protocol (IP) encryption system includes a cryptographic unit that processes sensitive data for packet encryption/decryption and data authentication. A first processing unit with an optional IP Layer hardware accelerator includes a data processing subsystem that processes sensitive data and forwards the data to the cryptographic unit for encryption and data authentication. A management subsystem is operative with the cryptographic unit for configuring IP networking functions and distributing network configuration information to the data processing subsystem through the cryptographic unit. Data processing is separated from management and control functions at the data processing and management subsystems. A second processing unit with an optional IP Layer hardware accelerator receives the encrypted data from the cryptographic unit and processes the encrypted data for IP packet routing, fragmentation and reassembly and receives network configuration information from the management subsystem via the cryptographic unit.

25 Claims, 4 Drawing Sheets

RED PROCESSING SUBSYSTEM WITH INTERGRATED MANAGEMENT SUBSYSTEM

SCALEABLE ARCHITECTURE TO SUPPORT HIGH ASSURANCE INTERNET PROTOCOL ENCRYPTION (HAIPE)

FIELD OF THE INVENTION

The present invention relates to encryption devices, and more particularly, this application relates to a scaleable hardware architecture to support High Assurance Internet Protocol Encryption (HAIPE).

BACKGROUND OF THE INVENTION

The HAIPIS Version 3.1 (High Assurance Internet Protocol Encryption Interoperability Specification) is the National Security Agency's latest secure internet protocol specification. HAIPIS is a powerful protocol that permits enclaves equipped with compliant gateways to communicate securely over untrusted networks.

The protocol is based on IPSec with additional restrictions and enhancements. These enhancements include multicast, over-the-network key establishment, Ethernet encapsulation, header compression, and support for Type-1 Suite A and Suite B algorithms. In addition, compliant devices support services such as networking, traffic protection, and management features that provide Information Assurance (IA) in IPv4/IPv6 networks.

The specification can scale to a range of channel capacities, performance levels and other aspects of individual applications. Scalability of HAIPE software components has been an area of active investigation by those skilled in the art. The challenge is to provide a hardware platform that provides the required level of computational support, but can be optimized with respect to cost, size, weight, and related features.

Many commercial and government entities are committed to a network-based communications strategy at all levels, from the Global Information Grid (GIG) to the Tactical Internet and Battlefield Mobile Networks. Commercial network security solutions do not fully address the government/military threat model. IPSec does not sufficiently address vulnerabilities and threats such as flow analysis, routing spoofs and key management spoofs. Features such as Over the Network Key Management, Secure Network Management, dynamic and authenticated peer discovery and guaranteed interoperability over segmented secure domains and public infrastructure are all required.

To address the need for a secure network communications specification, NSA formed the HAIPIS specification development effort. HAIPE IS version 1.x introduced basic signaling interoperability between various products and was primarily intended for enclave gateway implementations to address the flow analysis problem. HAIPE IS version 3.1 adds support for Internet Protocol Version 6 (IPv6), standardized over-the-network management and bandwidth efficient modes and transforms. HAIPE 3.x complaint products can be implemented in hosts and terminals, in addition to enclave gateway solutions.

HAIPIS is a powerful protocol and it is in early stages of proliferation. There is a need for a scalable, programmable HAIPE hardware architecture to address the performance requirements of a broad range of applications. In addition, a programmable platform would be able to accommodate changing requirements with a simple software upgrade.

SUMMARY OF THE INVENTION

A scalable internet protocol (IP) encryption system includes a cryptographic unit that processes sensitive data for packet encryption/decryption and data authentication. A first processing unit with an optional IP Layer hardware accelerator includes a data processing subsystem that processes sensitive data and forwards the data to the cryptographic unit for encryption and data authentication. A management subsystem is operative with the cryptographic unit for configuring IP networking functions and distributing network configuration information to the data processing subsystem through the cryptographic unit. Data processing is separated from management and control functions at the data processing and management subsystems. A second processing unit with an optional IP Layer hardware accelerator receives the encrypted data from the cryptographic unit and processes the encrypted data for IP packet routing, fragmentation and reassembly and receives network configuration information from the management subsystem via the cryptographic unit.

In one aspect, the first and second processing units correspond to respective red and black side subsystems. The first and second processing units and cryptographic unit are operative together in accordance with a High Assurance Internet Protocol Encryption (HAIPE) standard. The cryptographic unit could also be formed as a cryptographic processor and cryptographic accelerator formed from at least one Field Programmable Gate Array (FPGA) that extends the processing of sensitive data within the cryptographic processor for higher bandwidth applications.

In yet another aspect, the data processing and management subsystems can be formed from a field programmable gate array. The second processing unit can be formed from a field programmable gate array. The second processing unit can include an integrated control and data processor such that processing, management and configuration functions on data received from the cryptographic unit are consolidated within the integrated control and data processor. Each of the first and second processing units supports a layered IP protocol stack. The first and second processing units and cryptographic unit can each be formed as a field programmable gate array as a system-on-chip.

A method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
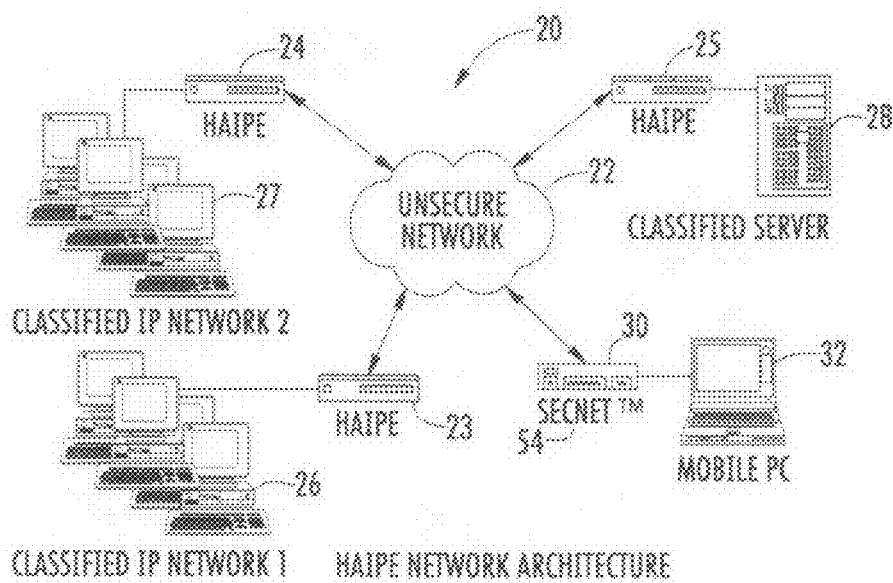
FIG. 1 is a block diagram illustrating a typical High Assurance Internet Protocol Encryption (HAIPE) network architecture.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY (physical layer) or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In accordance with a non-limiting example of the present invention, a scaleable, hardware architecture is applied for a secure High Assurance Internet Protocol Encryption (HAIPE) network. Field programmable gate arrays (FPGAs) introduce scalability and increase performance through hardware acceleration without requiring an increase in processor and memory performance. In the system as described, a hardware accelerator is tightly coupled to the processor to increase the overall system performance as compared to a discrete solution at comparable speeds. The reconfigurability of the field programmable gate arrays permits dynamic assignment of acceleration resources. The architecture is scaleable to meet the needs of different end applications and can be upgraded to meet current and future standard implementations. It can be customized through user defined algorithms or other unique requirements.

FIG. 1 is an example of a current HAIPE network architecture 20 that includes an unsecured network 22 that communicates with three different HAIPE devices 23, 24, 25, which connect to a respective first classified IP network 26, and a second classified IP network 27, and a classified server 28. The unsecured network 22 also connects to a SecNet 54 device 30, which connects to a mobile personal computer 32.

It should be understood that HAIPE is typically a type 1 encryption device that complies with the standards developed by the National Security Agency per HAIPE IS (also HAIPIS) High Assurance Internet Protocol Interoperability Specification. A HAIPE device is a secure gateway that allows two enclaves to exchange data over an untrusted network.

In one non-limiting example, a HAIPE device is a routing device, looking up the destination IP address of a packet in its internal routing table and picking the encrypted tunnel based on that table.

In addition to site encryptors, the HAIPE standard is also inserted into client devices that provide both wired and wireless capabilities. Some examples of HAIPIS offerings include:

Cisco 5750 KG-275;
General Dynamics TACLANE;
EADS Ectocryp™ Blue; and
ViaSat's AltaSec KG-250;

There are many considerations that drive the final implementation of any HAIPE solution. These considerations may include any or all of the following parameters: size, weight, power, cost, system performance, upgradeability, customer-unique requirements, and application.

When developing a scalable architecture, it is desirable to address these parameters, with the ability to trade-off performance of one parameter for a bias to another parameter, i.e., save costs for the penalty of decreased system performance. Different parameters drive the development of this particular architecture.

For example multiple applications are a factor. The architecture should be able to address multiple applications. HAIPE is an IP-layer encryption technique and not a physical-layer bulk-encryption device. The architecture should be able to be changed and/or expanded to include many different types of physical signaling and transport protocols. Examples include but not limited to Ethernet (copper or fiber), ATM, and SONET.

Independent performance requirements are a factor. While data throughput is an important measurement of any system, with HAIPE it is not the only important measurement. Other parameters include packet latency, packet-to-packet jitter, and Security Association (SA) establishment rate via Internet Key Exchange (IKE). Packet latency and jitter, for example, may be important in systems designed to protect streaming applications such as VoIP, while SA establishment rate may be more important in another system.

Customer-specific requirements are another factor. For applications developed under program funding, often the customer has specific needs that precipitate the program versus purchasing COTS components. These may include custom packaging, security requirements, or environmental conditions.

Size, weight and power (SWAP) are another factor. It is desirable that the architecture support optimizations for SWAP. As the scalable architecture is used in multiple implementations, each implementation has slightly different requirements for physical size, weight, and power dissipation. The optimal architecture allows optimizations in these areas to be made in trade to other design characteristics (performance, etc.).

Future upgrades are another factor. It is not uncommon for industry standards to evolve over time to include additional features. This is even an issue with closed proprietary interfaces/protocols. Therefore, the scalable architecture should support future upgrades in the hardware to accommodate increased processing or storage requirements.

Figure 2:
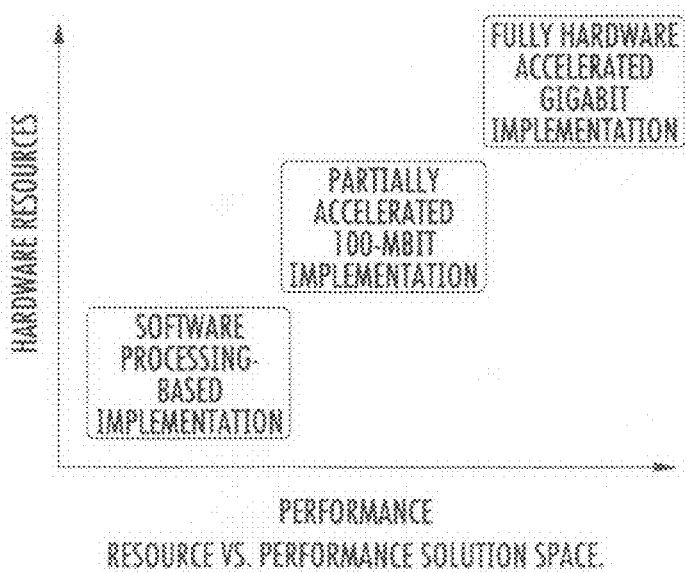
FIG. 2 is a graph showing a resource/performance solution space in a simplified fashion.

There are some hardware resource requirements necessary for IPSec and similar IP layer encryption solutions. There has also been work to evaluate the costs associated with network security. Generally, the resource/performance solution space can be represented in simplified fashion as shown in the graph of FIG. 2 showing the hardware resources versus performance for a software processing-based implementation, a partially accelerated 100-Mbit implementation and fully hardware accelerated gigabit implementation.

Figure 3:
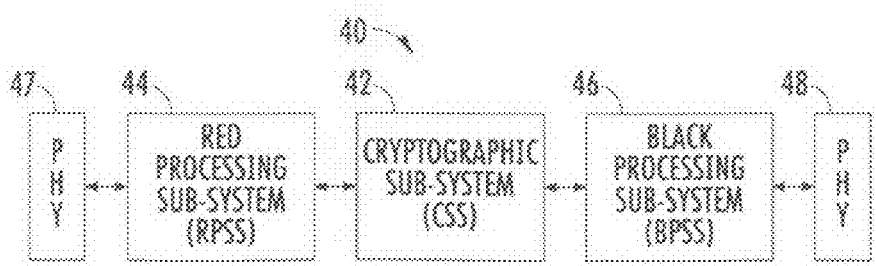
FIG. 3 is a high-level block diagram of a scaleable hardware architecture in accordance with a non-limiting example of the present invention.

A high-level block diagram of a Scalable Hardware Architecture in accordance with a non-limiting example of the present invention is shown in FIG. 3 at 40. The architecture was developed with a modular design in order to provide the necessary level of portability and scalability to support multiple End Crypto Units and applications. The architecture is partitioned into three functionally oriented subsystems (units), each of which will provide a specific set of capabilities through a combination of hardware and software. The term unit could also be used for subsystem since the subsystem is operable as a separate or modular unit. The Cryptographic Subsystem (CSS) 42 is responsible for all security critical functions. The Red Processing Subsystem 44 is responsible for Red-side data processing functions. The Black Processing Subsystem 46 is responsible for Black-side data processing functions. Both subsystems interact with respective physical (PHY) interfaces or devices 47, 48. These physical interfaces 47, 48 could be a radio, network port, or other physical interface and combination thereof.

The modular approach of the architecture is designed, in particular, to support state-of-the-art IP networking functionality with High Grade security (such as HAIPIS).

Figure 4:
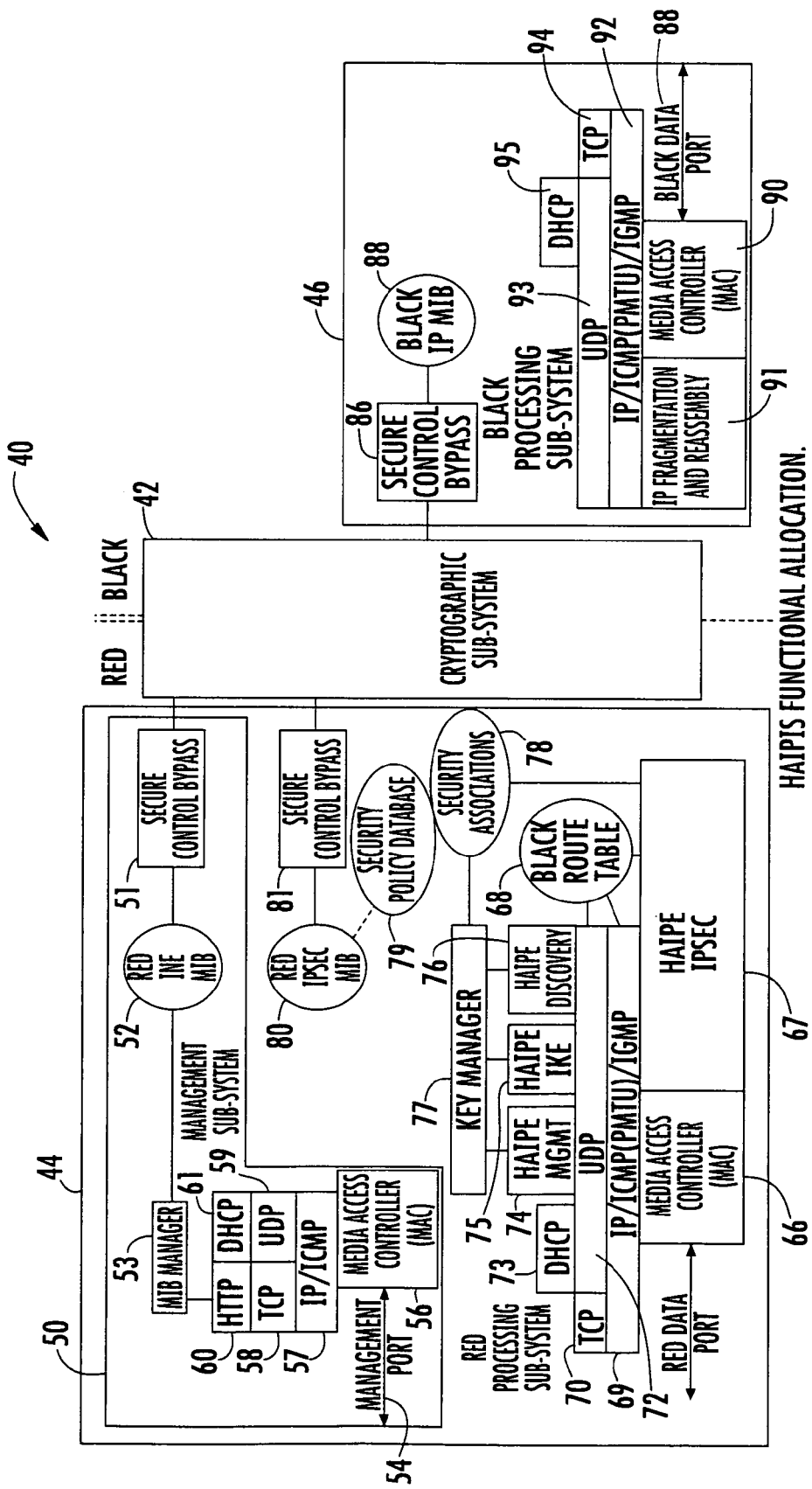
FIG. 4 is a block diagram showing a functional allocation of High Assurance Internet Protocol Internet Security (HAIPIS) networking capabilities across a subsystem architecture including a representation of layered IP protocol stacks supported by each subsystem in accordance with a non-limiting example of the present invention.

FIG. 4 is a block diagram showing a functional allocation of the HAIPIS networking capabilities across a subsystem architecture, including a representation of the layered IP protocol stacks supported by each subsystem. There are several aspects of the network architecture that provide an optimal combination of security and performance.

A Management Subsystem 50 is co-located with the Red Processing Subsystem 44. It could be physically isolated. This provides definitive separation of control and management information from traffic for both security and efficiency purposes, however, the Management Subsystem 50 is responsible for configuration of the overall IP networking function, including the processing, storing and distributing of configuration information to the Red and Black processing subsystems 44, 46 via the Cryptographic Subsystem 42 through a control bypass capability.

The Red Processing Subsystem 44 is responsible for IP security functions as defined for HAIPIS, including Security Associations (establishment and lookup), Internet Key Exchange, HAIPE discovery, IP packet routing and management. It should be understood that the red and black processing is a functional partitioning. Red corresponds typically to sensitive information, while black corresponds to data that has already been encrypted and is clear for the world to view. Data in the black processing subsystem has been protected such as through the cryptographic processor that is seen positioned between the red processing subsystem 44 and black processing subsystem 46. Thus, the red corresponds to critical material and data, while black is clear for the world to "touch" or view.

The Black Processing Subsystem 46 is responsible for IP packet routing, fragmentation, and reassembly. The Cryptographic Subsystem 42 is responsible for packet encryption/decryption and authentication functions.

The management subsystem 50 has a secure controlled bypass 51 that communicates with the cryptographic subsystem 42 and a Red INE MIB 52 and MIB manager 53. A management port 54 operates with a media access controller (MAC) 56 and the protocol stack that includes the IP/ICMP 57, TCP 58, UDP 59, HTTP 60 and DHCP 61. Other functional components of the red processing subsystem 44 include the media access controller (MAC) 66 that is operative with the HAIPE IP security (IPSEC) 67 and the black routing table 68 that is operative with the various components including the IP/ICMP (PMTU)/IGMP 69 and the TCP 70 and UDP 72. Further up the protocol is the DHCP 73 and the HAIPE management 74, HAIPE IKE 75 and HAIPE discovery 76. These components are operative with the key manager 77 and the security associations 78 and security policy database 79. The red IPSEC MIB 80 and the secure control bypass 81 are operative with database 79. The HAIPE discovery component 76 is operative with the black routing table 68.

The black processing subsystem 46 includes a secure control bypass 86 operative with the black IP MIB 87. The black data port 88 is operative with the media access controller (MAC) 90 and the IP fragmentation and reassembly 91. Higher protocol layers include the IP/ICMP (PMTU/IGMP) 92 and the UDP 93 and TCP 94 and DHCP 95.

Figure 5:
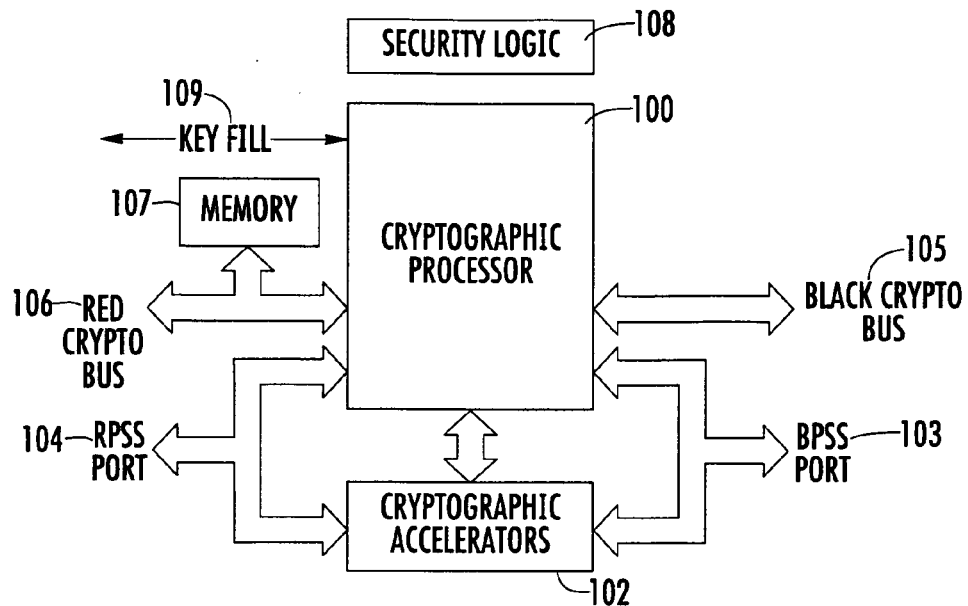
FIG. 5 is a block diagram showing a cryptographic subsystem (unit) in accordance with a non-limiting example of the present invention.

FIG. 5 shows a block diagram of greater details of the cryptographic subsystem 42 and illustrates a cryptographic processor 100 that could be a Harris Sierra II cryptographic processor and operative with cryptographic accelerators 102 and a Black Processing Sub-System (BPSS) port 103 and Red Processing Sub-System (RPSS) port 104. The cryptographic processor 100 is operative with the black crypto bus 105 and the red crypto bus 106 and memory 107. Security logic 108 and Key Fill communications 109 are possible.

Figure 6:
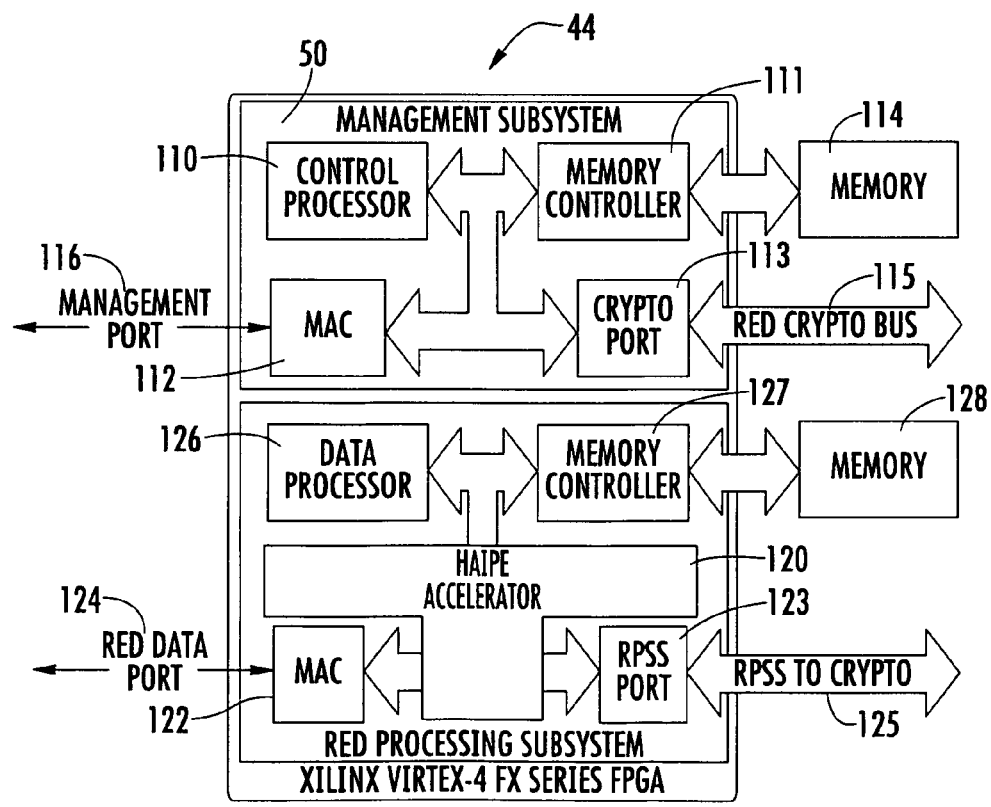
FIG. 6 is a block diagram showing details of the red processing subsystem (unit) with an integrated management subsystem in accordance with a non-limiting example of the present invention.

FIG. 6 shows the red processing subsystem 44 with the integrated management subsystem 50 as having a control processor 110, memory controller 111, media access control (MAC) 112, and crypto port 113. The memory controller 111 is operative with a memory 114 and the crypto port 113 is operative with the red crypto bus 115. The MAC 112 is operative with the management port 116.

The red processing system 44 can include a HAIPE accelerator 120 operative with a media access control (MAC) module 122 and RPSS port 123. The MAC module 122 is operative with the red data port 124 and the RPSS port 123 is operative with the RPSS to crypto interface 125. The HAIPE accelerator 120 is also operative with a data processor 126 and memory controller 127 that is operative with memory 128. The management subsystem 50 and red processing subsystem 44 can be included within a field programmable gate array such as in Xilinx Virtex-4 FX series FPGA.

The HAIPE accelerator 120 is operative to accelerate using hardware to perform functions faster than is possible in software operating in normal processors. Although processors are typically sequential and instructions executed one-by-one, hardware accelerators can be used to improve performance. Typically, hardware and software differences concern concurrency, allowing hardware to be faster than the software. Usually, the hardware accelerators are designed for computationally intensive software codes such as in the non-limiting examples and is a separate unit from the processor. The cryptographic processor can also include a cryptographic accelerator 102 as noted before relative to FIG. 5. Also, the management subsystem includes its own control processor and the red processing subsystem includes its data processor 126.

Figure 7:
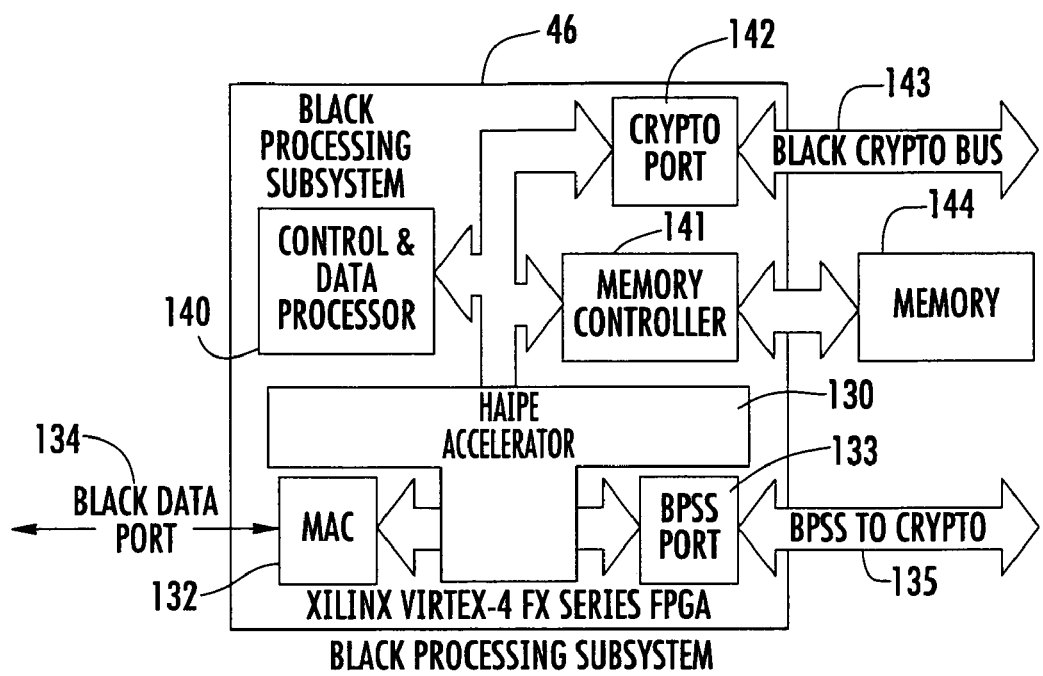
FIG. 7 is a block diagram showing details of the black processing subsystem (unit) in accordance with a non-limiting example of the present invention.

In FIG. 7 because the black processing subsystem is not a critical data function, but has data that has already been encrypted, the control and data processing can be accomplished within the single control and data processor module. The black processing subsystem 46 also includes a hardware accelerator 130 as the HAIPE accelerator.

FIG. 7 is a block diagram of the processing subsystem 46 and showing an HAIPE accelerator 130 operative with a media access control (MAC) module 132 and the BPSS port 133. The MAC 132 is operative with the black data port 134 and the BPSS port 133 is operative with the BPSS to crypto interface 135. A control and data processor 140, memory controller 141 and crypto port 142 are operative with the HAIPE accelerator 130. The crypto port 142 is operative with the black crypto bus 143 and the memory controller is operative with the memory 144.

The cryptographic processor 100 (FIG. 5) forms the base of the Cryptographic Subsystem (CSS) 42. All of the cryptographic functionality is contained within the Cryptographic Subsystem (CSS). The architecture is extendable (through the Cryptographic Accelerators 102 as FPGAs) to allow higher bandwidth applications to execute efficiently. This provides the capability to reach Gigabit speeds without significant modifications to the architecture and the certification philosophy. The architecture provides for a high degree of programmability allowing for the inclusion of all types of algorithms. Processing resources are also included within the CSS for cryptographic control and key management functions. Key wrap, key update, and public key algorithms all are implemented using the processing resources.

The Red Processing Subsystem 44 performs the Red-side data processing functions. To streamline data processing for high-speed applications, the Red-side control has been separated from the traffic data. The Red Processing Subsystem 44 performs only data processing. The red side control function is performed by the Management Subsystem 50. This divides the data and control functions between the data processor 126 and the control processor 110. The scalable hardware architecture provides for low rate applications in which both control and data functions can be performed by a single processor. If isolation is required between these functions, it can be implemented in separate devices or, by taking advantage of the new emerging "Single Chip Crypto" technology, reside in the same device.

The architectural approach of the red processing subsystem 44 is chosen to embed a complete subsystem-on-chip, preferably in one non-limiting example, through the use of a single FPGA. This integrated approach provides the scalability and high degree of flexibility in resource management necessary for both processing and FPGA fabric resources.

An example implementation of this architecture can use the Xilinx Virtex-4 based FPGA family with embedded PowerPC PPC405 processors. This allows reuse of existing Operating System (OS) licenses and drivers. This architecture is not vendor specific, and could be implemented in a variety of system-on-chip (SOC) FPGA-based platforms (Altera, Actel, etc.).

The larger offerings of the Xilinx Virtex-4 FX include two PowerPC 405 cores, two Ethernet MACs, and large amounts of configurable RAM. The data processor 126 is allocated one of two embedded PowerPC processors and a large portion of FPGA resources for hardware acceleration. All Red-side traffic functions that require software control can be executed from the embedded processor. Other parts of the programmable logic are used to implement specific link encryption functions (e.g., plaintext (PT) pattern generation/detection) or high speed networking functions (e.g., IPSec encapsulated security header generation). By taking advantage of FPGA technology, these functions, i.e., security association (SA) cache size, fragmentation buffer size, can be scaled up and down to meet the application's SWAP requirements.

The Management Subsystem 50 provides control and status of the electronic control unit (ECU). The Management Subsystem 50 communicates with the Red and Black Crypto Interface FPGAs via the security policy hosted within the Cryptographic Subsystem as shown in FIG. 6. The control processor 110 includes the second of two embedded PowerPC processors and a smaller share of the FPGA resources of the shared Xilinx Virtex-4 FX FPGA. The PowerPC can take on many roles, but in the IP encryptor application, the primary task is to perform network management functions. The FPGA provides the interface translation and expansion capabilities. For example, a checksum function that might need to be efficiently computed could be implemented in hardware.

As noted before, Black Processing Subsystem 46 is a less complex version of the Red Processing Subsystem 44 as shown in FIG. 7, and leverages the hardware implementation of the Red Processing Subsystem 44 for reduction of board design complexity, schedule reduction, and SWAP. Two major functions are performed by this subsystem: Black-side data processing and Black-side control. The Black Processing Subsystem consolidates the Processing, Management, and Configuration Subsystems into a single block because no isolation is required between the control and data functions.

All Black-side traffic functions that require software control can be executed from the embedded PowerPC. The programmable logic can be used to implement specific link encryption functions (e.g., MI encoding/decoding) or high speed networking functions (e.g., Black-side packet routing).

The scalable hardware architecture has been realized in several example implementations across different requirements spaces. A technology development platform has formed an initial basis for a proof of architecture. The platform contains two (2) Xilinx Virtex-4 FX60 FPGAs with embedded PPC405 processors, one (1) for the Black-side processing and one (1) for the Red-side processing. The cryptographic subsystem (CSS) may be implemented using Harris' Sierra™ II Programmable Cryptographic ASIC with a separate Cryptographic Accelerator daughter card. The platform contains circuitry to allow several different physical interfaces including Gigabit Ethernet, ISDN, PSTN modem, asynchronous and synchronous serial (RS232/RS-422), and analog voice (for VOIP applications).

The development platform was used to develop software-based HAIPE implementations for usage in scaled-down architectures and tactical radio embedments. It was also used as the "golden" reference model against which HAIPE hardware accelerators could be compared to ensure compliant processing of packets.

In this implementation, the Red and Black-side processing is being performed with 150 MHz clock rate CPUs while the cryptographic processing is being executed at 100 MHz. The reference point of 576-byte packets yields approximately 4 Mbps throughput performance. In addition to the technology development platform, this architecture has been implemented in a variety of other applications. It has been successfully scaled for both performance and cost.

The architecture can be easily scaled up for high performance applications by utilizing full hardware acceleration with software support to achieve gigabit rates and higher. This implementation includes full hardware acceleration of the Red, cryptographic, and Black HAIPE processing within the FPGA logic fabric. The Red and Black CPUs operate at a 300 MHz clock rate while the ASIC, such as Sierra II from Harris, operates at 98.304 MHz.

The architecture can be easily scaled down for low performance and cost sensitive applications by supporting a pure software-approach with no hardware acceleration. This implementation was developed for a limited throughput application with low recurring cost as the driving requirement. It utilizes a software-based approach to HAIPE processing with minimal FPGA logic acceleration and exhibits similar, though moderately decreased, throughput performance as the development platform.

There are several combinations of hardware acceleration using FPGA logic resources that can be selected for any required implementation. These include cryptographic acceleration and various levels of HAIPE processing acceleration. This provides a high degree of flexibility in the final implementation parameters, choosing the right level of acceleration for performance, size and power tradeoffs.

The scaleable architecture allows the physical hardware realization of a system implementation that is scaled from a common reference architecture. The advantages of a scalable architecture include but are not limited to:

1) A high level of design reuse at the hardware, FPGA, operating system, and application software level;

2) A common platform that design teams are familiar with across development projects; and 3) A quicker time-to-market, lower development costs, and increased probability for first-time success.

By using the reprogrammable hardware (FPGAs) (with either soft or hard microprocessor cores), along with the programmable cryptographic features of the Harris Sierra™ II IC, cryptographic systems as a non-limiting example with varying levels of performance, cost, power, and form-factor are easily obtained. These scalability factors, while presented in the context of a HAIPE implementation, apply equally in many other Type-1 encryption solution spaces. These spaces include serial-line encryptors (KG-84), high-speed link encryption (LEF), and many other applications.

Future adaptations of this architecture will support the implementation of the "Single-Chip Crypto" initiative. Where the logic resource requirements of a particular scaled implementation allow, the Red and Black subsystems may be combined into a single FPGA. This can drive new levels of scalability, yielding power and printed wiring board (PWB) real-estate savings. In addition, future implementations may be able to take advantage of the newer Xilinx Virtex-5 series FPGAs with embedded processors, allowing further performance enhancements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An Internet Protocol (IP) encryption system, comprising:
   a cryptographic unit that processes sensitive data for packet encryption/decryption and data authentication;
   a first processing unit comprising a data processor that processes sensitive data and forwards the sensitive data to the cryptographic unit for encryption and data authentication, and a control processor that is separate from the data processor and operative with the cryptographic unit for configuring IP networking functions and distributing network configuration information to the data processor through the cryptographic unit, wherein data processing is separated from management and control functions at the separate control processor; and
   a second processing unit that receives encrypted data from the cryptographic unit and processes the encrypted data for IP packet routing, fragmentation and reassembly and receives network configuration information from the management subsystem via the cryptographic unit.

2. The IP encryption system according to claim 1, wherein said first and second processing units comprise respective red and black side subsystems.

3. The IP encryption system according to claim 1, wherein said first and second processing units and cryptographic unit are operative together in accordance with an encryption standard.

4. The IP encryption system according to claim 1, wherein said cryptographic unit comprises a cryptographic processor and a cryptographic accelerator comprising at least one field programmable gate array (FPGA) that extends the processing of sensitive data within the cryptographic processor for applications requiring higher bandwidth and/or customer-unique algorithms.

5. The IP encryption system according to claim 1, wherein said first processing unit comprises a field programmable gate array (FPGA).

6. The IP encryption system according to claim 5, wherein said FPGA includes a hard and/or soft macro central processing unit.

7. The IP encryption system according to claim 5, wherein said FPGA includes an IP Layer hardware accelerator.

8. The IP encryption system according to claim 1, wherein said second processing unit comprises a field programmable gate array (FPGA).

9. The IP encryption system according to claim 8, wherein said FPGA contains a hard and/or soft macro central processing unit.

10. The IP encryption system according to claim 8, wherein said FPGA includes an IP Layer hardware accelerator.

11. The IP encryption system according to claim 1, wherein processing, management and configuration functions on data received from the cryptographic unit are consolidated within said data processor.

12. The IP encryption system according to claim 1, wherein each of said first and second processing units support a layered IP protocol stack.

13. A system for processing Internet Protocol (IP) layer data, comprising:
   a red side processing subsystem that comprises a data processor that processes sensitive data for IP security functions, and a control processor that is separate from the data processor that configures IP networking functions, wherein data processing is separated from management and control functions at the separate control processor;
   a cryptographic unit that receives sensitive data from the red side processing subsystem and processes the sensitive data for packet encryption/decryption and data authentication while receiving network configuration information from the management subsystem; and
   a black side processing subsystem that receives encrypted data from the cryptographic unit and processes the encrypted data for IP packet routing, fragmentation and reassembly and receives network configuration information from the management subsystem via the cryptographic unit.

14. The system according to claim 13, wherein said red and black side processing subsystems are operative together in accordance with an encryption standard.

15. The system according to claim 13, wherein said cryptographic unit comprises a cryptographic processor and a cryptographic accelerator comprising at least one field programmable gate array (FPGA) that extends the processing of sensitive data within the cryptographic processor for applications requiring higher bandwidth and/or customer-unique algorithms.

16. The system according to claim 13, wherein said black side processing subsystem comprises an integrated control and data processor wherein processing, management and configuration functions on data received from the cryptographic unit are consolidated within said integrated control and data processor.

17. The system according to claim 13, wherein said red and black side processing subsystems each support a layered IP protocol stack.

18. A method for encrypting Internet Protocol (IP) layer data, comprising:
   processing sensitive data within a data processor;
   configuring IP networking functions within a control processor that is separate from the data processor;
   forwarding the sensitive data to a cryptographic unit for encryption and data authentication;
   distributing network configuration information from the control processor through the cryptographic unit such that data processing is separated from management and control functions at the control processor and divided between the data processor and control processor;
   receiving the encrypted data from the cryptographic unit; and
   processing the encrypted data for IP packet routing, fragmentation and reassembly while receiving network configuration information from the control processor via the cryptographic unit.

19. The method according to claim 18, which further comprises encrypting and authenticating sensitive data within a cryptographic unit comprising a cryptographic processor and a cryptographic accelerator comprising at least one field programmable gate array (FPGA) that extends the processing of sensitive data within the cryptographic processor for applications requiring higher bandwidth and/or customer-unique algorithms.

20. The method according to claim 18, which further comprises processing the sensitive data within a field programmable gate array (FPGA).

21. The method according to claim 20, wherein said FPGA includes a hard and/or soft macro central processing unit.

22. The method according to claim 20, wherein said FPGA includes an IP Layer hardware accelerator.

23. The method according to claim 18, which further comprises processing the encrypted data for IP packet routing, fragmentation and reassembly within a field programmable gate array (FPGA).

24. The method according to claim 23, wherein said FPGA contains a hard and/or soft macro central processing unit.

25. The method according to claim 23, wherein said FPGA includes an IP Layer hardware accelerator.

\* \* \* \* \*